United States Patent Office 3,060,896
Patented Oct. 30, 1962

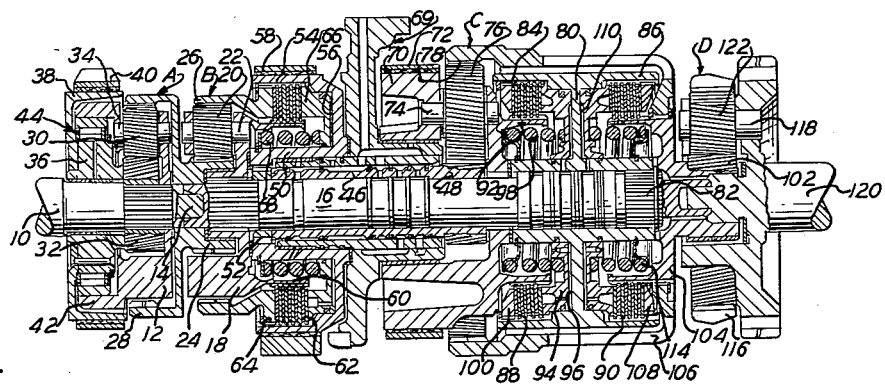

3,060,896
PRESSURE CONTROL VALVE MECHANISM
Joseph H. McIntyre, Birmingham, Mich., assignor to Ford Motor Company, Dearborn, Mich., a corporation of Delaware
Filed Mar. 10, 1960, Ser. No. 14,093
13 Claims. (Cl. 121—38)

My invention relates generally to multiple speed, power transmitting gear mechanisms, and more particularly to a means for controlling the relative speeds of the gear elements of such a mechanism whereby a smooth engagement of the torque transmitting elements of the mechanism may be accomplished.

My invention finds particular utility in a control system for a multiple speed transmission of the type disclosed in the co-pending application of Raymond J. Miller et al., Serial No. 725,967, filed April 2, 1958, which is assigned to the assignee of my instant invention, and reference may be had to this co-pending application for the purpose of supplementing my instant disclosure.

The transmission of the above Miller et al. application includes a plurality of planetary gear units and fluid pressure operated clutch and brake servos for controlling the relative motion of the elements of the gear units. The servos are energised by fluid control pressure that is made available by an engine driven fluid pressure pump drivably geared or otherwise connected to power input portions of the transmission mechanism. The servos and the pump form a part of a control circuit, and conduit structure is provided for hydraulically connecting the discharge side of the pump with the servos. Operator controlled pressure distributor valves are disposed in the conduit structure for appropriately distributing control pressure to the servos to condition the transmission for operation in various speed ratios.

According to a preferred embodiment of my invention, the clutch servos are disposed in one region of the control circuit and the brake servos are disposed in another region thereof, and the two regions of the circuit are semi-isolated from one another by suitable pressure limiting and regulator valves that are effective to establish pressures of different magnitudes in the two regions during a gear ratio shift interval. A manually controlled valve operating member is used to actuate the distributor valve elements in the portion of the circuit in which the clutch servos are situated, and during normal driving operation speed ratio shifts may be accomplished merely by appropriating positioning the valve element operating member.

Under some operating conditions it becomes desirable to provide a gradual pressure build-up in the clutch servos, and for this reason a transmission feathering valve is situated in the circuit region in which the clutch servos are located. The feathering valve may be actuated by means of a suitable mechanical linkage or the like. If the transmission mechanism is used in the power train of a farm tractor, for example, such a feathering valve will give the vehicle operator a more delicate control of the transmission and will permit the operator to inch the vehicle for and aft while coupling and de-coupling various tractor driven farm implements. The feathering valve can also be used for the purpose of interrupting the power delivery paths during an emergency by disengaging the energized transmission clutch.

The normal transmission operating procedure will require only a limited use of the feathering valve, but it has been found in actual practice that unskilled operators employ the feathering valve in excess during manual shifting operations in conjunction with the clutch pressure distributor valve controls. In such instances the feathering valve often is actuated too quickly so that a pressure build-up occurs in the clutch servos at an excessive rate. This causes overstressing of the clutches and other components of the transmission mechanism, and premature failures result.

According to a principal feature of my invention, I have provided an improved feathering valve mechanism that incorporates a delaying means for obtaining a delayed movement by the operator of the feathering valve mechanism, and in this way the rate of engagement of the transmission clutches is not dependent upon the driving habits of the vehicle operator. This delayed action is of particular importance in those instances when the transmission is conditioned for operation in one of the higher speed ratios and when an attempt is made to start the vehicle from stall without sequencing the transmission through the various lower driving speed ratios.

The provision of an improved control system of the type above described being a principal object of my invention, it is a further object of my invention to provide a feathering valve mechanism having a dashpot means incorporated therein for establishing a desired maximum rate of pressure build-up in the clutch servos.

It is a further object of my invention to provide a control circuit for a multiple speed power transmission mechanism having pressure operated control elements and having an operator controlled pressure regulator valve in the transmission control circuit capable of establishing a maximum pressure build-up from a low circuit pressure to an operating pressure level intermediate the maximum circuit pressure and the exhaust pressure, and which will permit a subsequent pressure build-up from the intermediate pressure level to the maximum pressure level at any desired rate.

It is a further object of my invention to provide a control circuit of the type above set forth and which is characterized by a minimum number of components with small manufacturing tolerances and precision fits.

It is a further object of my invention to provide a control circuit of the type above described in which many of the elements of the circuit are interchangeable.

It is a further object of my invention to provide an improved feathering valve of the type above described and which may be incorporated into transmission control circuits of known construction with a minimum degree of alteration.

For the purpose of particularly describing a preferred embodiment of my invention, reference will be made to the accompanying drawings, wherein:

FIGURE 1 shows in schematic form a multiple speed power transmission gear arrangement which is adapted to be controlled by a control circuit incorporating the improvement of my invention;

FIGURE 2 is a schematic drawing of a control circuit capable of being used with the transmission mechanism of FIGURE 1 and which incorporates the improvement of my instant invention.

Figure 3:
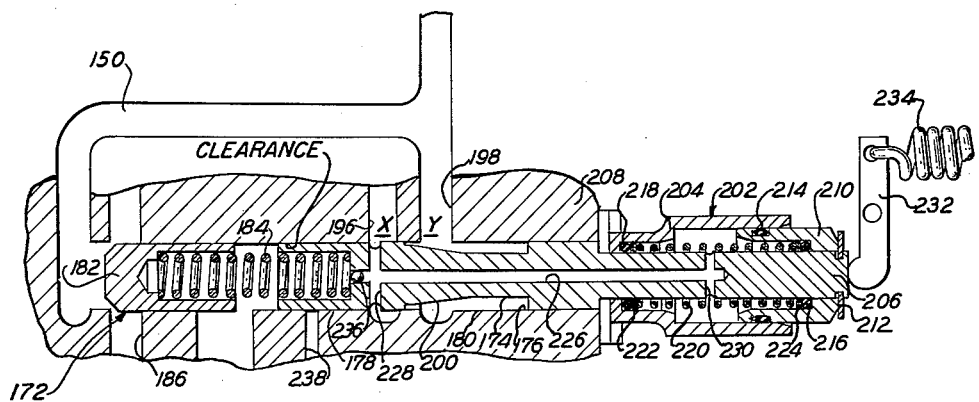
FIGURE 3 is a cross sectional view of the transmission feathering valve mechanism of my instant invention and which may be used in the control circuit of FIGURE 2.

Referring first to the schematic drawing of FIGURE 1, the transmission mechanism includes four axially spaced planetary gear units which are respectively identified by reference characters A, B, C and D, each of these units having a sun gear, a ring gear, a plurality of planetary pinions and a common carrier for the planetary pinions.

Numeral 10 designates a transmission power input shaft which can be drivably connected to the vehicle crankshaft by suitable clutch structure, not shown. The carrier 12 for the planetary gear unit A is splined or otherwise positively connected to shaft 10. The end of shaft 10 may be formed with a reduced diameter so that it may be piloted, as shown at 14, within a cooperating recess formed in a coaxial main shaft 16. A carrier 18 for the planetary gear unit B is splined or otherwise positively connected to the left end of main shaft 16, as viewed in FIGURE 1, and carrier 18 in turn carries a plurality of pinions 20 mounted on pinion shafts 22 which form a part of the carrier 18. Pinions 20 are disposed in meshing engagement with sun gear 24 of planetary gear unit B and with ring gear 26 of the planetary gear unit B. Sun gear 24 is connected to ring gear 28 of planetary gear unit A. Planet pinions 30 for the gear unit A are disposed in driving engagement with ring gear 28 and with a sun gear 32 of the planetary gear unit A, and these pinions are journaled on pinion shafts 34 which form a part of carrier 12.

Sun gear 32 is integrally formed with a clutch hub 36 that is journaled for rotation about shaft 10. The hub 36 carries a brake drum 38 about which is disposed brake band 40. A suitable fluid pressure operated servo can be used for energizing brake band 40. This servo forms a part of the control circuit subsequently to be described. A clutch member 42 is carried by carrier 12 of the gear unit A and it defines an outer race which cooperates with an inner race formed on the clutch hub 36. An overrunning clutch mechanism, generally designated by numeral 44, is situated between the inner and outer races defined by clutch hub 36 and clutch member 42, said clutch 44 accommodating relative, free rotation between clutch hub 36 and clutch member 42 in one direction but inhibiting relative rotation therebetween in the other direction.

A sleeve shaft 46 is disposed about an intermediate section of main shaft 16 and it is integrally formed at one end thereof with sun gear 48 of gear unit C. The other end of shaft 46 is positively splined or otherwise secured to a control member 50, a suitable splined connection being shown at 52. Member 50 defines a brake drum 54 and it also defines a clutch servo pressure cylinder 56. A brake band 58 encircles brake drum 54 and it may be energized by a suitable brake operating servo as will subsequently be explained with reference to the circuit diagram of FIGURE 2.

Carrier 18 of gear unit B has formed thereon a clutch member 60 that is externally splined to facilitate a driving connection with internally splined clutch discs, the latter forming a part of a clutch disc assembly 62. The interior of drum 54 is internally splined to facilitate a driving connection with internally splined clutch discs of the disc assembly 62. Ring gear 26 of the gear unit B is drivably connected to drum 54 as indicated, a suitable splined connection 64 being provided for this purpose.

Cylinder 56 has disposed therein an annular piston 66 which is adapted to engage and energize the discs of clutch disc assembly 62 when the fluid pressure chamber defined by cylinder 56 and by the piston 66 is pressurized. Piston 66 is normally urged in a right-hand direction, as viewed in FIGURE 1, by the piston return spring 68 which may be anchored by a suitable reaction ring carried by member 50.

Numeral 69 generally designates a portion of the transmission housing and it includes relatively stationary sleeve extensions surrounding sleeve shaft 46 for the purpose of providing a bearing support. Carrier 70 of the planetary gear unit C may also be journaled on a part of the housing 69 as indicated.

A brake band 72 surrounds the carrier 70 for the gear unit C and it also may be applied by means of a suitable servo mechanism which forms a part of the control circuit of FIGURE 2. Carrier 70 includes pinion shafts 74 on which are journaled a plurality of planet pinion gears 76 that drivably engage a ring gear 78 for the gear unit C and the aforementioned sun gear 48 of the gear unit C.

A compound clutch member is shown at 80 and it is positively splined or otherwise secured to main shaft 16 by means of a connection, such as splined connection 82, said shaft 16 being received through the hub of member 80 as indicated. Member 80 also includes drum portions 84 and 86 which are internally splined to accommodate externally splined clutch discs of clutch disc assemblies 88 and 90, respectively.

Carrier 70 has formed thereon a clutch portion 92 which is externally splined to accommodate internally splined clutch discs of the clutch disc assembly 88. An annular piston 94 is disposed within an annular cylinder 96 defined by clutch member 80, and it is normally urged in a right-hand direction as viewed in FIGURE 1 by a clutch piston return spring 98. A spring anchor member is carried by the hub of member 80 to provide a seat for spring 98.

The clutch disc assembly 88 further includes a reaction member 100 carried by drum portion 84, and when cylinder 96 is pressurized piston 94 energizes the clutch disc assembly 88 to form a driving connection between member 80 and carrier 70.

The sun gear for gear unit D is shown at 102 and it is rotatably journaled about a reduced diameter extension of main shaft 16. Sun gear 102 is integrally formed with a clutch member 104 which is externally splined to accommodate internally splined clutch discs of the clutch disc assembly 90. Member 104 is also splined or otherwise positively coupled to a torque transfer member 106 that forms a driving connection between ring gear 78 of gear unit C and member 104.

Drum portion 86 of member 80 is intternally splined to form a driving connection with externally splined clutch discs of the clutch disc assembly 90, and it also carries a thrust reaction member 108 to absorb the clutch actuating force applied to the clutch discs.

The hub of member 80 defines an annular cylinder 110 within which is disposed an annular piston 112, said cylinder 110 and piston 112 cooperating to define a fluid pressure working chamber. Piston 112 is normally urged toward a retracted position by piston return spring 114 which is anchored on a spring seat element carried by the hub of member 80.

Ring gear 116 for the gear unit D is nonrotatably fixed to the transmission casing and it serves as a reaction member for the gear unit D. Carrier 118 of gear unit D is connected to power output shaft 120 and it carries pinion shafts on which planetary pinions 122 are mounted.

For purposes of further discussion, the above-described brake bands 40, 58 and 72 will hereinafter be referred to as brake band 1, brake 2 and brake band 3, respectively. Also, the disc clutch assemblies 62, 88 and 90 will hereinafter be referred to as clutch 1, clutch 2 and clutch 3, respectively.

Gear unit D forms a part of each of the power flow paths of the transmission mechanism and it provides an additional reduction which is common to all the transmission speed ratios.

Gear units B and C are controlled by brake bands 2 and 3 and by clutches 1, 2 and 3 to provide five different power flow paths of varying torque ratio, and the sequences of operation of these clutches and brakes are established by the control mechanism schematically illustrated in FIGURE 2. Gear unit A functions as a torque ratio splitter unit and it may be operated in alternating sequence with the operation of the control clutches and brakes for the other gear units to establish a plurality of over-all torque ratios equal in number to twice the number of speed ratios which are made available by gear units B and C.

To obtain the lowest forward driving speed ratio, brake band 3 and clutch 3 are simultaneously applied by appropriately energizing the associated clutch and brake servos. In this instance engine torque is delivered to the carrier for gear unit A and the sun gear 32 for gear unit A becomes locked to the carrier 12 by overrunning clutch 44. Gear unit A thus becomes locked up for operation with a gear ratio of unity. Gear unit B provides a divided power delivery path therethrough, a portion of the torque being delivered to sun gear 24 of gear unit B from gear unit A being transferred through carrier 18 to the main shaft 16 and the remaining portion of the torque being delivered to ring gear 26 and through clutch member 50 to sleeve shaft 46. The direction of the torque applied to sleeve shaft 46 is therefore in a direction opposite to that of the torque delivered to the main shaft 16.

The torque delivered to shaft 16 is transferred through the engaged clutch 3 and to carrier 70 of gear unit C and the torque delivered to sleeve shaft 46 is transferred to sun gear 48 of gear unit C. The resulting torque output of ring gear 78 of gear unit C is transferred through torque transfer member 106 to sun gear 102 to gear unit D and then to the power output shaft 120, gear unit D functioning to further multiply the main shaft torque as previously explained.

To establish the second forward driving ratio, clutch 3 is released and clutch 2 is applied, brake band 3 remaining applied. Torque delivered through gear unit A drives sun gear 24 of gear unit B which causes a reverse torque to be delivered to ring gear 26 of gear unit B. Carrier 18 of gear unit B is held stationary and serves as a reaction member, the torque reaction of the carrier 18 being transferred through the main shaft and through the applied clutch 2 to the carrier 70 which is anchored by brake band 3.

The torque of ring gear 26 of gear unit B is transferred through member 50 to sleeve shaft 46 which drives sun gear 48 in a reverse direction, and since carrier 70 is anchored by brake band 3 as previously mentioned, ring gear 78 of gear unit C is driven in a forward direction. This forward rotation is imparted to sun gear 102 of gear unit D through torque transfer member 106 thereby driving power output shaft 120 in a forward direction.

To obtain third speed operation, the transmission clutches and brake bands are conditioned as previously explained with reference to first speed operation, except that brake band 1 for gear unit A is applied. It is thus apparent that the gear unit A will assume an overdrive condition to provide an increased over-all speed ratio, the overrunning clutch 44 being effective in this case to allow relative motion between carrier 12 and clutch hub 36. The sun gear 32 of gear unit A acts as a reaction member. The torque delivered to sun gear 24 of gear unit B is therefore lesser in magnitude than engine torque, but the power flow path through gear units B, C and D is the same as that previously described with reference to the first speed ratio operation.

To obtain fourth speed ratio operation, the transmission clutches and brakes are conditioned in the same manner as that which was previously described with reference to second speed ratio operation except that brake band 1 of gear unit A is applied. It is therefore apparent that the power flow paths for second and fourth speed operation will be similar except that the latter is the overdrive of the former.

To obtain fifth speed operation, brake band 2 and clutch 3 are applied while clutches 1 and 2 and brake bands 1 and 2 are released. The engine torque which is delivered to sun gear 24 of gear unit B is multiplied by gear unit B and transferred through carrier 18 to main shaft 16, ring gear 26 of gear unit B functioning as a reaction member. The main shaft torque is then transferred through clutch member 80 and through applied clutch 3 to sun gear 102 of gear unit D, the latter transferring the main shaft torque to power output shaft 120 with a multiple speed reduction ratio.

To obtain sixth speed opertaion, clutch 3 is released and clutch 2 is applied. Brake band 2 remains applied and clutches 1 and 2 and brake band 1 remain released as in the case of fifth speed operation. Engine torque delivered to sun gear 24 of gear unit B is again multiplied by gear unit B and delivered to main shaft 16. Ring gear 26 of gear unit B and sun gear 48 of gear unit C both function as torque reaction members since they are anchored by brake band 2. The torque of the main shaft is delivered through the clutch member 80 and through the applied clutch 2 to the carrier 70, and the overdriven ring gear 78 therefore transfers reduced torque to sun gear 102 of gear unit D, the latter again multiplying the torque with its fixed multiplication ratio.

Seventh speed ratio operation is merely the overdrive ratio of fifth speed operation and is obtained by applying brake band 1 while the remaining clutches and brakes assume the condition previously described with reference to fifth speed operation. Sun gear 24 of gear unit B is therefore driven with an overdrive ratio and the resulting torque delivered to main shaft 16 is again transferred through applied clutch 2 and to the power output shaft 120 through gear unit D.

Eighth speed operation is merely the overdrive ratio of sixth speed operation and it is obtained by applying brake band 1 while the remaining clutches and brakes retain the position assumed during sixth speed operation. Sun gear 24 of gear unit B is thus overdriven and the resulting torque is transferred through the main shaft 16 and through the applied clutch 2 to the carrier 70. The overdriven ring gear 78 again transfers torque to the sun gear 102 of gear unit D, and power output shaft 120 is therefore driven with an increased speed ratio.

Ninth speed operation is obtained by applying clutches 1 and 2 and by releasing brakes 2 and 3 and clutch 3. Engine torque is therefore delivered through gear unit B which is locked up. The power transferred through gear unit B is delivered through carrier 18 of gear unit B to the main shaft 16, and the remaining portion of the power is transferred from ring gear 26 of gear unit B through applied clutch 1 and thence to sleeve shaft 46. Since clutches 1 and 2 are both applied, the gear unit C assumes a locked up condition and the torque of main shaft 16, which is transferred through applied clutch 2 and through gear unit C, combines with the torque delivered to the sun gear 48 of gear unit C to drive ring gear 78 of gear unit C without multiplication. The torque transfer member 106 again functions to deliver power from ring gear 78 of gear unit C to sun gear 102 of gear unit D.

Tenth speed operation is merely the overdrive of ninth speed ratio operation and it is obtained by applying brake band 1 while the remaining clutches and brakes assume the condition previously described with reference to ninth speed operation.

The transmission mechanism shown in FIGURE 1 is capable of providing two reverse drive ratios. To obtain the first reverse speed ratio, brake band 3 and clutch 1 are applied while the remaining clutches and brakes are released. Since clutch 1 is applied, gear unit B is locked up and engine torque is therefore transferred through gear unit B and through the applied clutch to sleeve shaft 46. This causes sun gear 48 of gear unit C to rotate in a forward direction. Since carrier 70 is anchored by brake band 3, carrier 70 functions as a reaction member and ring gear 78 is driven in a reverse direction. This reverse rotation is imparted to sun gear 102 of gear unit D thereby causing power output shaft 120 to rotate in a reverse direction at an increased torque multiplication ratio.

The second reverse drive speed ratio is merely the overdrive of the first reverse speed ratio, and it is obtained by applying brake 1 while the remaining clutches and brakes assume the condition previously described with reference to the first reverse speed ratio operation.

The transmission mechanism may also be conditioned for park by simultaneously applying brake bands 2 and 3 while the remaining clutches and brakes are released. Brake bands 2 and 3 are applied under the influence of spring pressure as will subsequently become apparent from the description of the control circuit of FIGURE 2, and they will automatically assume an applied condition when the engine is inoperative and when control circuit pressure is unavailable. The brake bands 2 and 3 therefore provide a direct connection between the power output shaft 120 and the stationary transmission casing.

Referring next to FIGURE 2, I have schematically illustrated a control circuit for sequentially operating the various clutches and brakes to obtain the various speed ratio changes above described. This circuit comprises an engine driven control pressure pump 124 and brake operating servos for brake bands 2 and 3 as shown at 126 and 128, respectively. The fluid pressure operated clutches 1, 2 and 3 have been designated in FIGURE 2 by the same reference numerals 62, 88 and 90, respectively, which were used in the description of the transmission structure of FIGURE 1. Also, the fluid pressure operated servo for applying brake band 1 has been identified by reference numeral 130.

Conduit structure interconnects the engine driven pump 124 with the various clutch and brake servos and it includes a passage 132 with two branch passages 134 and 136 extending respectively to the servo 126 for the brake band 2 and to the servo 128 for the brake band 3. Each of the servos 126 and 128 includes servo pistons movably mounted in cooperating servo cylinders, and the pistons for the respective servos are normally urged in a brake applying direction by a servo spring. The branch passages 134 and 136, respectively, communicate with one side of the servos 126 and 128 and they function to distribute fluid pressure to the servos to move the servo pistons toward a brake release position against the opposing force of the servo springs. Similarly, these branch passages are adapted to allow the pressurized fluid to become exhausted from the servos when brake bands 2 and 3 are applied. It is possible, however, for fluid pressure to be distributed from pump 24 to servo 126 through the one-way check valve 140. This valve is normally spring biased toward a closed position, but it may be opened under pressure whenever branch passage 134 is pressurized.

Another check valve 142 is situated in branch passage 136 and it is also normally urged toward a passage closing position to block branch passage 136. Valve 142 is adapted to be unseated by an extension 144 carried by a piston for the brake servo 126. When branch passage 136 is pressurized, valve 142 becomes unseated thereby permitting distribution of pressure to the release side of brake servo 128.

A pressure distributor valve is located in branch passage 134, as shown at 146. This valve 146 comprises a double land valve spool which is normally spring biased in a downward direction, as viewed in FIGURE 2, thereby allowing branch pasage 134 to become exhausted through the associated exhaust port. When valve 146 is moved in an upward direction, as viewed in FIGURE 2, fluid communication is established between passage 132 and branch passage 134, thereby allowing the release side of the piston for servo 126 to become pressurized. In a similar fashion, a pressure distributor valve 148 is disposed in branch passage 136, and when it assumes a downward position under the influence of the valve spring, branch passage 136 is exhausted through the associated exhaust port. When valve 148 is moved in an upward direction, passage 132 is brought into fluid communication with passage 136, thereby causing the release side of the piston for servo 128 to become pressurized. As previously mentioned, valve 142 will become unseated to permit the distribution of fluid pressure to servo 128.

Valves 146 and 148 may be controlled by the vehicle operator by means of a suitable camshaft or some other manually operated valve operating linkage mechanism. If a particular shift sequence makes it necessary to disengage brake band 3 and to simultaneously engage brake band 2, valve 148 is moved in an upward direction and valve 146 is simultaneously moved in a downward direction. Pressure is thus immediately distributed to the release side of the servo 128, as previously explained. When the piston for the brake servo 128 has been partially stroked, valve 138 unlocks passage 134 and this immediately opens an exhaust flow path for the release side of brake servo 126. The fluid pressure in servo 126 is thus exhausted through branch passage 134 and through the exhaust port associated with valve 146. It is thus apparent that valve 138 provides an effective interlock between the two brake servos whereby it is impossible for both brake servos to become energized simultaneously.

In a similar fashion, if a shift requires engagement of brake band 3 and disengagement of brake band 2, the servo piston for brake servo 126 will unseat valve 142. This immediately opens an exhaust flow path for the release side of brake servo 128. During such a shift, valves 146 and 148 are moved to the position shown in FIGURE 2 and branch passage 136 is exhausted through the opening associated with valve 148. Simultaneously, passage 132 is again brought into fluid communication with branch passage 134, and the release side of brake servo 126 is pressurized so that the servos assume the position shown in FIGURE 2.

The control circuit further includes another passage 150 which functions to distribute control pressure to a plurality of clutch pressure distributor valves shown at 152, 154 and 156. These valves are similar in form to the previously described valves 146 and 148. Valve 152 is adapted to control the distribution of fluid pressure from passage 150 to a passage 158 extending to fluid pressure operated clutch 62 and it is normally spring biased in a downward direction as viewed in FIGURE 2 by a valve spring. When valve 152 assumes a downward position, passage 158 extending to clutch 62 is exhausted through the exhaust port associated with valve 152.

When valve 152 is moved in an upward direction against the opposing force of the valve spring, the exhaust port for valve 152 is closed and passage 150 is brought into fluid communication with passage 158, thereby causing the clutch assembly 62 to become pressurized.

Valves 154 and 156 function in a similar manner to control the distribution of control pressure from passage 150 to the passages 160 and 162, respectively. When these valves assume an upward position, passage 150 is brought into fluid communication with associated passages 160 and 162, and when they assume a downward position under the influence of the valve spring, the passages 160 and 162 are exhausted through the associated exhaust ports for valves 154 and 156, respectively.

Passage 150 also distributes fluid pressure to a passage 164 extending to brake servo 130, and a brake servo distributor valve 166 is interposed between passages 150 and 164 to control the pressure distribution therebetween. Valve 166 is similar in form to the previously described valves 146, 148, 152, 154 and 156, and when it assumes the position shown in FIGURE 2, passage 164 is pressurized, thereby allowing brake band 1 to become applied. When valve 166 is allowed to move under the influence of the valve spring pressure in a downward direction, communication between passages 150 and 164 is interrupted and passage 164 is exhausted through the exhaust port associated with valve 166.

A one-way check valve 168 is situated in passage 164, although a suitable bypass bleed opening 167 may be formed in the valve seat for valve 168 to permit a reduced rate of pressure distribution to the servo 130 when the valve 166 is moved to the position shown in FIGURE 2. This cushions the application of brake band 1 and it improves the shift quality. When valve element 166 is moved in a downward direction, valve 168 may be opened to permit an uninhibited flow of fluid from the applied side of brake servo 130 to the sump through the exhaust port for valve 166.

The fluid pressure distributor valves 146, 148, 152, 154, 156 and 166 are controlled by means of a camshaft having a plurality of cam elements adapted to individually adjust the several pressure distributor valve elements upon rotation of the camshaft by the vehicle operator to initiate the various shifts from one ratio to another. Rotation of the camshaft to one angular position will cause the transmission to be conditioned for operation in one speed ratio, and further rotation of the camshaft will initiate a shift to the next speed ratio, one angular position corresponding to each of the ten forward drive speed ratios and the two reverse drive speed ratios. A transition from one speed ratio to any of the other nine forward drive speed ratios can be accomplished merely by appropriately adjusting the camshaft, and the transmission need not be sequenced through the various other intermediate speed ratios.

The brake band servos 126 and 128 are situated in a first circuit portion comprising in part passage 132 and branch passages 134 and 136. Clutches 62, 88 and 90 and brake servo 130, together with the associated fluid pressure distributor valves 152, 154, 156 and 166, are situated in a second circuit portion. The two circuit portions are separated by a transmission pressure regulator valve identified by reference numeral 170. This valve is normally spring biased in a downward direction, as viewed in FIGURE 2, to interrupt communication between passage 132 and passage 150. The valve 170 is calibrated so that it becomes unseated at a pressure of approximately 150 p.s.i. Passage 150 has disposed therein a transmission feathering valve generally identified by reference numeral 172, said valve comprising a movable valve spool 174 movably positioned in a cooperating valve chamber 176. Valve spool 174 is formed with a pair of valve lands 178 and 180, and when valve spool 174 is positioned as shown in FIGURE 2, the pressure on the downstream side of regulator valve 170 is freely distributed through passage 150. Valve spool 174 may be adjustably position by the vehicle operator and when it assumes a downward position valve land 178 blocks passage 150.

A movable valve plunger 182 is situated at one end of the valve chamber 176 and a valve spring chamber 184 is disposed between valve plunger 182 and valve spool 174 to normally bias plunger 182 in an upward direction. When it assumes the forward position shown in FIGURE 2, valve plunger 182 blocks exhaust port 186, but when valve plunger 182 moves downwardly, port 186 is brought into fluid communication with passage 150, the latter communicating with the upper end of valve chamber 178 as indicated.

The feathering valve 172 is only schematically illustrated in the circuit diagram of FIGURE 2 and it will be more fully described hereinafter with reference to FIGURE 3.

It will be apparent from the foregoing that the transmission feathering valve 172 is capable of controlling the distribution of fluid pressure to clutches 62, 88 and 90, as well as to the brake band servo 130. Although the distributor valves 152, 154, 156 and 166 control the distribution of pressure from passage 150 to the various clutch or brake servos, the feathering valve 172 functions to regulate the magnitude of the pressure which is made available to passage 150.

When the valve spool 174 assumes a downward position, passage 150 is blocked as previously explained. However, when the vehicle operator adjusts valve spool 174 in an upward direction, as viewed in FIGURE 2, passage 150 becomes unblocked and spring 184 becomes compressed. At the instant passage 150 becomes unblocked by valve land 178, exhaust port 186 is in an open position. As the valve spool 174 is moved further in an upward direction, the compression on spring 184 is increased and this tends to restrict valve port 186. This is accompanied by a pressure build-up in passage 150, and the pressure which is distributed to valve plunger 182 by the passage 150 opposes and balances the force of spring 184. Further movement of valve spool 174 in an upward direction will be accompanied by a further pressure build-up in passage 150. When the valve plunger 182 and valve spool 174 are moved to the ultimate position shown in FIGURE 2, the exhaust port 186 is completely blocked and the pressure in passage 150 will have assumed a maximum value.

The magnitude of the pressure in the first circuit portion above described is established by a pressure relief valve 188 situated in parallel relationship with respect to the regulator valve 170. Relief valve 188 is calibrated at a higher value then regulator valve 150. In a preferred control circuit embodying my invention, relief valve 188 becomes unseated at a pressure of approximately 175 p.s.i., thereby establishing communication between passage 132 and a passage 190 extending to the transmission lubrication circuit. A lubrication pressure regulating valve is shown at 192 and it is situated in the lubrication passage 190 as shown. Valve 192 is spring biased to normally close exhaust port 194, and when a desired lubrication pressure is established, for example 43 p.s.i., exhaust port 194 is opened.

The control circuit shown in FIGURE 2 further shows a power take-off clutch and a power take-off feathering valve, as well as a relief valve for regulating the power take-off clutch pressure. This power take-off clutch and valve arrangement is not functionally related to that portion of the control circuit of which the improved transmission feathering valve of my instant invention forms a part, and it will not be particularly described with reference to FIGURE 2 or FIGURE 1. Reference may be made to the above-mentioned co-pending application of Miller et al. for a complete description of the power take-off clutch and valve arrangement.

It is apparent from the foregoing that the first circuit portion will be supplied with control pressure before control pressure is made available to the second circuit portion. This prevents any possibility of applying the transmission clutches when the transmission is locked up with both the second and third brake bands applied. Also, during a shift from fourth speed ratio to fifth speed ratio, and vice versa, the shift quality is improved since the disengagement of the servo for brake band 2 or the servo for brake band 3, as appropriate, will be accelerated by reason of the higher operating pressure level of the first circuit portion thereby allowing the brake servo for brake bands 2 or 3 to become released before the cooperating clutch is fully applied.

It is also apparent from an inspection of FIGURE 2 that the first, second or third clutches or first brake servo can be released by adjusting the feathering valve spool 174 in a downward direction as viewed in FIGURE 2, thereby interrupting the power delivery path for any of the ten forward speed ratios and the two reverse speed ratios. The feathering valve can then be moved to the position shown in FIGURE 2 to condition the transmission mechanism for torque delivery and to accelerate the vehicle from a standing start in any of the speed ratios which are available. If the transmission feathering valve is actuated too quickly by the vehicle operator, the rate of pressure build-up in passage 150 becomes excessive and the transmission components may be overstressed. In order to overcome this condition, I have provided an improved feathering valve mechanism which is illustrated in FIGURE 3.

Referring next to FIGURE 3, control pressure from the transmission regulator valve is distributed to the transmission feathering valve through an inlet port 196, and regulated control pressure is distributed from the transmission feathering valve through a port 198, the ports 196 and 198 forming a part of passage 150 described with reference to FIGURE 2. Port 198 communicates with valve chamber 176 at a location between valve lands 178 and 180, and the valve spool 174 is tapered as shown at 200 to provide an annular opening of varying size between inlet port 196 and the valve chamber 176.

The left end of valve spool 174 and the right end of valve plunger 182 are formed with bored openings within which is situated the aforementioned valve spring 184.

I have generally shown a dashpot mechanism at 202 and it comprises a cylinder 204 which surrounds a reduced diameter extension 206 of spool valve 174. Cylinder 204 may suitably be fixed to the control valve body shown in part at 208. A piston member 210 is secured to the extremity of extension 206 by a washer 212 or by any other suitable fastening means. Suitable O-ring seals or the like may be used as shown at 214 and 216 for the purpose of respectively forming a seal between the piston 210 and the surrounding cylinder 204 and between the piston 210 and the extension 206. Similarly, an O-ring seal can be provided as shown at 218 between extension 206 and the other end of the cylinder 204.

A compression spring 220 is interposed between the left end of cylinder 204 and the piston 210, and it may be seated on circular washers 222 and 224 situated adjacent O-rings 216 and 218, respectively.

Valve spool 174 is formed with a longitudinal bore 226 which communicates with a radial passage 228 formed in valve spool 174 in the region of the inlet port 196. Bore 226 also communicates with a radial passage 230 formed in extension 206, said passage 230 communicating with an annular space defined by the cylinder 204 and by piston 210.

A suitable mechanical linkage mechanism, represented by a lever 232, may be used for the purpose of actuating the valve spool 174 in a left-hand direction to provide a progressive pressure build-up in passage 150 in the fashion previously described. Lever 232 may be normally urged in a clockwise direction, as viewed in FIGURE 2, by a tension spring 234 anchored to a relatively fixed portion of the transmission mechanism or to the vehicle chassis. During operation of the feathering valve mechanism shown in FIGURE 3, the vehicle operator may rotate the lever 232 in a counterclockwise direction by means of a foot pedal or the like against the opposing force of spring 234, and this will cause the spring 220 to urge valve spool 174 in a right-hand direction thereby relieving through port 186 the pressure in passage 150 and port Y and causing the first, second and third clutches or the first brake servo to become released. When the valve spool 174 is in this exhaust position, control pressure is distributed from the inlet port X through the bore 226 and then to the annular space within the dashpot cylinder 204. The left end of bore 226 may be closed by a steel ball 236 press fitted therein as indicated.

When the vehicle operator retracts the feathering valve operating foot pedal, spring 234 will cause lever 232 to urge valve spool 174 in a left-hand direction. When radial passage 228 moves in this fashion to the cutoff edge for inlet port X, and when it has been completely closed off by the surrounding wall of the valve chamber 176, the pressure which is made available to port Y and to the passage 150 will be approximately 15 p.s.i. At this point the oil in the dashpot cylinder is trapped and the only path through which this oil can escape is through the annular passage between valve land 178 and the surrounding valve chamber 176. Valve land 178 and the valve chamber 176 can be formed with a desired clearance to permit this leakage to take place.

Valve spool 174 will continue to move in this fashion by reason of the leakage which takes place around valve land 178, and this of course results in a progressive pressure build-up in port Y and passage 150.

Valve spool 174 will continue to move in this fashion until radial passage 228 becomes aligned with an exhaust port 238 formed in the valve body, the port 238 communicating with valve chamber 176 at a location spaced from inlet port 196. At this point pressure at port 196 will be approximately 95 p.s.i.

At the instant radial passage 228 becomes aligned with port 238, the fluid within the dashpot cylinder will immediately become exhausted into the sump region and the valve spool 174 will move instantly to the fully engaged, left-hand position, and full line pressure will then be made available to the transmission clutches. It is thus apparent that the pressure build-up will occur in successive stages, the first pressure build-up stage from zero gauge pressure to 15 p.s.i. being entirely under the control of the vehicle operator and the second build-up stage from 15 p.s.i. to 95 p.s.i. being controlled by the dashpot mechanism 202 independently of the driving habits of the operator. The third pressure build-up stage from 95 p.s.i. to maximum control pressure occurs only after the clutches have been applied, and the sudden pressure change which takes place during the third pressure build-up stage will not cause an undesirably rough clutch engagement.

The spring 234 has, of course, a substantially greater spring rate than the spring rate for spring 220 since it must overcome the opposing influence of spring 220 during the period in which the valve spool 174 is moved in a left-hand direction.

Having thus described a preferred embodiment of my invention, together with a transmission control circuit capable of being used with a farm tractor transmission, what I claim and desire to secure by United States Letters Patent is:

1. In a power transmission mechanism having a fluid pressure operated servo for controlling torque transmitting portions of the mechanism, a fluid pressure source, conduit structure interconnecting said servo and said pressure source, a feathering valve mechanism disposed in and partly defining said conduit structure and including a valve chamber, an exhaust port in said valve chamber, a valve means including a bipartite movable valve element disposed in said valve chamber for progressively restricting the degree of communication between said conduit structure and said exhaust port upon movement of said valve element in one direction, a spring disposed between the valve element parts, one valve element part being urged to an exhaust port closing position by said spring, the pressure in said conduit structure on the downstream side of said valve mechanism acting on said one part to oppose the force of said spring, the other valve element part being adapted to establish and interrupt communication between said conduit structure and said exhaust port upon movement thereof in said one direction and in the opposite direction, respectively, means for normally urging said other valve element part in said one direction, personnally operable means for retracting said other valve element in said opposite direction, and a dashpot mechanism having portions connected to said other valve element part and adapted to retard the rate of movement thereof in said one direction whereby said feathering valve mechanism is effective to establish a controlled degree of pressure build-up in said servo.

2. In a power transmission mechanism having a fluid pressure operated servo for controlling the operation of torque transmitting portions of the mechanism, a fluid pressure source, conduit structure interconnecting said servo and said pressure source, a bipartite distributor valve means disposed in and partly defining said conduit structure for controlling the rate of distribution of pressurized fluid to said servo, an exhaust port, one part of said valve means establishing communication between said source and said conduit structure upon movement thereof in one direction, spring means disposed between the parts of said valve means for urging said one part in the opposite direction and the other part in said one direction, said other part interrupting progressively communication between said exhaust port and said conduit structure when it is urged in said one direction, and a dashpot mechanism connected to said one part of said valve means, said dashpot mechanism being adapted to retard the rate of movement of said one part whereby the fluid pressure made available to said servo increases in magnitude at a controlled rate.

3. In a power transmission mechanism having a fluid pressure operated servo for controlling the operation of torque transmitting portions of the mechanism, a fluid pressure source powered by rotary portions of said mechanism, conduit structure interconnecting said source and said servo, distributor valve means having two relatively movable parts disposed in and partly defining said conduit structure for controlling the rate of pressure build-up in said servo, yieldable means normally acting on one part of said valve means for establishing a progressively increasing pressure build-up in said servo during relative displacement of said parts within predetermined limits, the servo pressure being caused to increase to a maximum level upon relative displacement of said parts beyond said limits, and dashpot means for retarding the movement of the other valve part whereby said pressure build-up occurs at a controlled rate.

4. In a power transmission mechanism having a fluid pressure operated servo for controlling the operation of torque transmitting portions of the mechanism, a fluid pressure source powered by rotory portions of said transmission, conduit structure interconnecting said source and said servo, distributor valve means disposed in and partly defining said conduit structure including relatively movable valve parts for controlling the rate of distribution of pressurized fluid to said servo, a valve body, a valve chamber in said valve body for receiving said valve parts, and dashpot means for retarding the rate of relative motion of said distributor valve parts whereby the pressure in said servo increases at a controlled rate, said dashpot means comprising a movable member carried by one of said valve parts, a dashpot pressure chamber defined in part by said movable member, a fluid flow restricting passage extending from said dashpot pressure chamber to a low pressure region of said conduit structure, and a clearance between said one valve part and said valve chamber, said clearance defining a portion of said flow restricting passage.

5. In a power transmission mechanism having a fluid pressure operated servo for controlling the operation of torque transmitting portions of the mechanism, a fluid pressure source, conduit structure interconnecting said servo and said pressure source, a feathering valve mechanism disposed in and partly defining said conduit structure and including a valve chamber, an exhaust port in said valve chamber, a first movable valve element in said chamber adapted to control the degree of communication between said conduit structure and said exhaust port upon movement thereof in one direction, said valve mechanism further including a second valve element adjacent said first valve element, valve spring means disposed between said valve elements, said first valve element being subjected to the fluid pressure in said conduit structure on the downstream side of said feathering valve mechanism whereby the biasing force of said valve spring is opposed by the fluid pressure force acting on said first valve element, means for normally urging said second valve element in said one direction, personally operable means for retracting said second valve element in the opposite direction, and a dashpot mechanism having portions connected to said second valve element for retarding the rate of movement of said second valve element in said one direction whereby said feathering valve mechanism is effective to establish a controlled rate of pressure build-up in said servo.

6. In a power transmission mechanism having a fluid pressure operated servo for controlling the operation of torque transmitting portions of the mechanism, a fluid pressure source, conduit structure interconnecting said servo and said pressure source, a feathering valve mechanism disposed in and partly defining said conduit structure and including a valve chamber, an exhaust port in said valve chamber, a first movable valve element adapted to control the degree of communication between said conduit structure and said exhaust port upon movement thereof in one direction, said valve means further including a second valve element adjacent said first valve element, a first valve spring disposed between said valve elements, said first valve element being subjected to the fluid pressure in said conduit structure on the downstream side of said feathering valve mechanism whereby the biasing force of said valve spring is opposed by the fluid pressure force acting on said first valve element, a main valve spring acting on said second valve element whereby said first valve element is normally urged by said first valve spring in said one direction, personally operable means for retracting said second valve element in the opposite direction, and a dashpot mechanism having portions connected to said second valve element for retarding the rate of movement of said second valve element in said one direction whereby said feathering valve mechanism is effective to establish a controlled rate of pressure build-up in said servo.

7. In a power transmission mechanism having a fluid pressure operated servo for controlling the torque transmitting portions of the mechanism, a fluid pressure source, conduit structure interconnecting said servo and said pressure source, a feathering valve mechanism disposed in and partly defining said conduit structure and including a valve chamber, an exhaust port in said valve chamber, movable valve parts disposed in said valve chamber, one valve part being adapted to restrict progressively the degree of communication between said conduit structure and said exhaust port upon movement thereof in one direction, the other valve part controlling distribution of pressure from said source to said servo a main valve spring acting on said valve parts for normally urging the same in said one direction means for yieldably urging said valve parts apart, personally operable means for retracting said valve parts in the opposite direction, and a dashpot means for controlling the rate of movement of said other valve part in said one direction whereby said feathering valve mechanism is effective to establish a controlled rate of pressure build-up in said servo.

8. In a power transmission mechanism having a fluid pressure operated servo for controlling torque transmitting portions of the mechanism, a fluid pressure source, conduit structure interconnecting said pressure source and said servo, a feathering valve means disposed in and partly defining said conduit structure including relatively movable valve parts, an exhaust port, one valve part being adapted to restrict progressively the degree of communication between said conduit structure and said exhaust port upon movement thereof in one direction, the other valve part controlling distribution of said pressure from said source to said servo, relative movement of said valve parts from one relative position to another being accompanied by a change in servo pressure from a low value to a higher value, and means for retarding the rate of relative motion of said other valve part during movement thereof throughout a range of positions intermediate said one and said other position whereby the pressure build-up in said servo is progressive.

9. In a multiple speed power transmission mechanism having a fluid pressure operated servo for controlling the operation of torque transmitting portions of the mechanism, a fluid pressure source powered by rotary portions of said transmission mechanism, conduit structure interconnecting said source and said servo, feathering valve means disposed in and partly defining said conduit structure including relatively movable valve parts for controlling the rate of distribution of pressurized fluid to said servo, said valve parts being disposed within a cooperating valve chamber, dashpot means defined in part by said relatively movable valve parts for retarding the rate of relative motion of said valve parts whereby the pressure in said servo increases at a controlled rate, said dashpot means including a dashpot member connected to one of said valve parts and defining therewith a fluid pressure chamber, said one valve part and said valve chamber being provided with a clearance therebetween, and passage structure extending from said pressure chamber to the region of said clearance, the fluid within said pressure chamber being displaced through said passage structure and through the passage defined by said clearance when said one valve part is actuated.

10. In a multiple speed power transmission mechanism having a fluid pressure operated servo for controlling the operation of torque transmitting portions of the mechanism, a fluid pressure source powered by rotary portions of said transmission mechanism, conduit structure interconnecting said source and said servo, feathering valve means disposed in and partly defining said conduit structure including relatively movable valve parts for controlling the rate of distribution of pressurized fluid to said servo, said valve parts being disposed within a cooperating valve chamber, dashpot means defined in part by said relatively movable valve parts for retarding the rate of relative motion of said valve parts whereby the pressure in said servo increases at a controlled rate, said dashpot means including a dashpot member connected to one of said valve parts and defining therewith a fluid pressure chamber, said one valve part and said valve chamber being provided with a clearance therebetween, passage structure extending from said pressure chamber to the region of said clearance, the fluid within said pressure chamber being displaced through said passage structure and through the passage defined by said clearance when said one valve part is actuated, a main spring acting on said one valve part for normally biasing the latter toward a servo pressure increasing position, and operator controlled means for retracting said one valve part toward a servo exhausting position against the opposing force of said main spring.

11. A transmission feathering valve comprising a fluid pressure conduit, means for supplying pressure to said conduit, a valve body, a valve chamber in said valve body, first and second valve elements in said valve chamber, a spring interposed between said valve elements, an exhaust port in said valve chamber, said conduit communicating with said valve chamber at one side of said first valve element, said first valve element progressively reducing the degree of communication between said conduit and said exhaust port upon movement thereof in a first direction, a dashpot member cooperating with said second valve element to define therewith a dashpot pressure chamber, said second valve element and said valve chamber being provided with a clearance therebetween thereby forming an annular flow restricting passage, a high pressure port in said valve chamber communicating with said pressure source, and passage structure extending from said dashpot chamber to said flow restricting passage, said high pressure port communicating directly with said passage structure when said second valve element is moved in a second direction, the fluid in said dashpot chamber being displaced through said passage structure and through said flow restricting passage upon movement of said second valve element in said first direction, said passage structure moving out of direct communication with said pressure port upon partial movement of said second valve element in said first direction.

12. A transmission feathering valve comprising a fluid pressure conduit, means for supplying pressure to said conduit, a valve body, a valve chamber in said valve body, first and second valve elements in said valve chamber, a spring interposed between said valve elements, an exhaust port in said valve chamber, said conduit communicating with said valve chamber at one side of said first valve element, said first valve element progressively reducing the degree of communication between said conduit and said exhaust port upon movement thereof in a first direction, a dashpot member cooperating with said second valve element to define therewith a dashpot pressure chamber, said second valve element and said valve chamber being provided with a clearance therebetween thereby forming an annular flow restricting passage, a high pressure port in said valve chamber communicating with said pressure source, passage structure extending from said dashpot chamber to said flow restricting passage, said high pressure port communicating directly with said passage structure when said second valve element is moved toward a second servo exhausting position, the fluid in said dashpot chamber being displaced through said passage structure and through said flow restricting passage upon movement of said second valve element toward a servo pressurizing position, said passage structure moving out of direct communication with said pressure port upon partial movement of said second valve element toward said first position, a main spring means for normally urging said second valve element in said first direction, and personally operable means for retracting said second valve element against the opposing force of said main valve spring.

13. A transmission feathering valve comprising a fluid pressure conduit, means for supplying pressure to said conduit, a valve body, a valve chamber in said valve body, first and second valve elements in said valve chamber, a spring interposed between said valve elements, an exhaust port in said valve chamber, said conduit communicating with said valve chamber at one side of said first valve element, said first valve element progressively reducing the degree of communication between said conduit and said exhaust port upon movement thereof in one direction, a dashpot member cooperating with said second valve element to define therewith a dashpot pressure chamber, said second valve element and said valve chamber being provided with a clearance therebetween thereby forming an annular flow restricting passage, a high pressure port in said valve chamber communicating with said pressure source, passage structure extending from said dashpot chamber to said flow restricting passage, said high pressure port communicating directly with said passage structure when said second valve element is moved toward a first servo exhausting position, the fluid in said dashpot chamber being displaced through said passage structure and through said flow restricting passage upon movement of said second valve element toward a second servo pressurizing position, said passage structure moving out of direct communication with said pressure port upon partial movement of said second valve element toward said first position, and a second exhaust port communicating with said valve chamber at a location spaced from said high pressure port, said passage structure communicating directly with said second exhaust port and exhausting said dashpot chamber when the pressure in said servo increases to a desired operating level.

References Cited in the file of this patent

UNITED STATES PATENTS

| | | |
|---|---|---|
| 577,489 | Mills | Feb. 23, 1897 |
| 1,712,089 | Miles | May 7, 1929 |
| 2,151,057 | Suth | Mar. 21, 1939 |
| 2,392,421 | Stephens | Jan. 8, 1946 |
| 2,403,519 | Gardiner | July 9, 1946 |

FOREIGN PATENTS

| | | |
|---|---|---|
| 458,280 | Canada | July 26, 1949 |